(12) United States Patent
Schall et al.

(10) Patent No.: US 8,933,986 B2
(45) Date of Patent: Jan. 13, 2015

(54) NORTH CENTERED ORIENTATION TRACKING IN UNINFORMED ENVIRONMENTS

(75) Inventors: Gerhard Schall, Graz (AT); Alessandro Mulloni, Graz (AT); Gerhard Reitmayr, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 13/112,268

(22) Filed: May 20, 2011

(65) Prior Publication Data

US 2011/0292166 A1 Dec. 1, 2011

Related U.S. Application Data

(60) Provisional application No. 61/349,617, filed on May 28, 2010.

(51) Int. Cl.
| | |
|---|---|
| *H04N 7/00* | (2011.01) |
| *G06T 7/20* | (2006.01) |
| *G06T 3/40* | (2006.01) |
| *H04N 5/232* | (2006.01) |

(52) U.S. Cl.
CPC .......... *H04N 5/23238* (2013.01); *G06T 7/2033* (2013.01); *G06T 3/4038* (2013.01); *G06T 2207/30244* (2013.01); *G06T 2207/20016* (2013.01); *G06T 7/208* (2013.01)
USPC .................................... 348/37; 348/E07.001

(58) Field of Classification Search
CPC ... H04N 5/23238; H04N 5/2259; H04N 3/02; H04N 7/183; G02B 27/642
See application file for complete search history.

(56) References Cited

U.S. PATENT DOCUMENTS

| | | | |
|---|---|---|---|
| 6,356,297 B1 | 3/2002 | Cheng et al. | |
| 6,563,529 B1 | 5/2003 | Jongerius | |
| 6,657,667 B1 | 12/2003 | Anderson | |
| 7,035,760 B2 | 4/2006 | Kobayashi et al. | |
| 7,082,572 B2 | 7/2006 | Pea et al. | |
| 7,126,630 B1 | 10/2006 | Lee et al. | |
| 7,508,977 B2 | 3/2009 | Lyons et al. | |

(Continued)

OTHER PUBLICATIONS

B. H. Thomas, V. Demczuk, W. Piekarski, D. Hepworth, and B. Gunther. A wearable computer system with augmented reality to support terrestrial navigation. In Proc. ISWC'98, pp. 168-171, Pittsburgh, PA, USA, Oct. 19-20, 1998.

(Continued)

*Primary Examiner* — Dave Czekaj
*Assistant Examiner* — Nam Pham

(57) ABSTRACT

A mobile platform uses orientation sensors and vision-based tracking to track with absolute orientation. The mobile platform generates a panoramic map by rotating a camera, which is compared to an image frame produced by the camera, to determine the orientation of the camera with respect to the panoramic map. The mobile platform also estimates an orientation of the panoramic map with respect to a world reference frame, e.g., magnetic north, using orientation sensors, including at least one accelerometer and a magnetic sensor. The orientation of the camera with respect to the world reference frame is then determined using the orientation of the camera with respect to the panoramic map and the orientation of the panoramic map with respect to the world reference frame. A filter, such as a Kalman filter, provides an accurate and stable estimate of the orientation of the panoramic map with respect to the world reference frame.

26 Claims, 5 Drawing Sheets

(56) References Cited

U.S. PATENT DOCUMENTS

| | | | |
|---|---|---|---|
| 7,522,186 B2 | 4/2009 | Arpa et al. | |
| 7,630,571 B2 | 12/2009 | Cutler et al. | |
| 7,752,008 B2 | 7/2010 | Satoh et al. | |
| 7,966,563 B2* | 6/2011 | VanBree | 715/713 |
| 7,999,842 B1 | 8/2011 | Barrus et al. | |
| 8,411,091 B2 | 4/2013 | Horri et al. | |
| 2001/0010546 A1* | 8/2001 | Chen | 348/218 |
| 2003/0035047 A1 | 2/2003 | Katayama et al. | |
| 2003/0063133 A1 | 4/2003 | Foote et al. | |
| 2003/0091226 A1 | 5/2003 | Cahill et al. | |
| 2005/0190972 A1 | 9/2005 | Thomas et al. | |
| 2006/0023075 A1 | 2/2006 | Cutler | |
| 2007/0025723 A1 | 2/2007 | Baudisch et al. | |
| 2007/0109398 A1 | 5/2007 | Teo | |
| 2007/0200926 A1 | 8/2007 | Chianglin | |
| 2008/0106594 A1 | 5/2008 | Thrun | |
| 2009/0086022 A1* | 4/2009 | Finn et al. | 348/143 |
| 2009/0110241 A1* | 4/2009 | Takemoto et al. | 382/103 |
| 2009/0179895 A1 | 7/2009 | Zhu et al. | |
| 2009/0316951 A1 | 12/2009 | Soderstrom | |
| 2010/0026714 A1 | 2/2010 | Utagawa | |
| 2010/0111429 A1* | 5/2010 | Wang et al. | 382/233 |
| 2010/0208032 A1 | 8/2010 | Kweon | |
| 2010/0302347 A1* | 12/2010 | Shikata | 348/36 |
| 2011/0234750 A1 | 9/2011 | Lai et al. | |
| 2011/0285810 A1 | 11/2011 | Wagner et al. | |
| 2011/0285811 A1 | 11/2011 | Langlotz et al. | |

OTHER PUBLICATIONS

B. Hoff and R. Azuma. Autocalibration of an electronic compass in an outdoor augmented reality system. In Proc. ISAR 2000, pp. 159-164, 2000.

G. Reitmayr and T. W. Drummond. Going out: Robust tracking for outdoor augmented reality. In Proc. ISMAR 2006, pp. 109-118, Santa Barbara, CA, USA, Oct. 22-25, 2006.

G. Reitmayr and T. W. Drummond. Initialisation for visual tracking in urban environments. In Proc. ISMAR 2007, pp. 161-160, Nara, Japan, Nov. 13-16, 2007.

G. Schall, D. Wagner, G. Reitmayr, E. Taichmann, M. Wieser, D. Schmalstieg, and B. Hofmann-Wellenhof. Global pose estimation using multi-sensor fusion for outdoor augmented reality. In Proc. ISMAR 2009, pp. 153-162, Orlando, Florida, USA, 2009.

Kiyohide Satoh, Mahoro Anabuki, Hiroyuki Yamamoto, Hideyuki Tamura, "A Hybrid Registration Method for Outdoor Augmented Reality," isar, pp. 67, IEEE and ACM International Symposium on Augmented Reality (ISAR'01), 2001.

M. Ribo, P. Lang, H. Ganster, M. Brandner, C. Stock, and A. Pinz. Hybrid tracking for outdoor augmented reality applications. IEEE Comp. Graph. Appl., 22(6):54-63, 2002.

R. Azuma, B. Hoff, H. Neely, and R. Sarfaty. A motion-stabilized outdoor augmented reality system. In Proc. IEEE VR, pp. 252-259, Houston, Texas, USA, 1999.

R. Azuma, J. W. Lee, B. Jiang, J. Park, S. You, and U. Neumann. Tracking in unprepared environments for augmented reality systems. Computer & Graphics, 23(6):787-793, 1999.

Reinhold Behringer, "Registration for Outdoor Augmented Reality Applications Using Computer Vision Techniques and Hybrid Sensors," vr, pp. 244, IEEE Virtual Reality Conference 1999 (VR '99), 1999.

S. You, U. Neumann, and R. Azuma. Hybrid inertial and vision tracking for augmented reality registration. In Proc. VR 1999, pp. 260-267, Houston, Texas, USA, Mar. 13-17, 1999.

Schall, G. et.al., "North-Centred Orientation Tracking on Mobile Phones", Mixed and Augmented Reality (ISMAR), 2010 9th IEEE InternationalSymposium, p. 267, Oct. 13-16, 2010.

Schmalstieg, et al., "Augmented Reality 2.0" Virtual Realities, Springer Vienna, 2011.

Suya You, Ulrich Neumann, and Ronald Azuma. 1999. Orientation Tracking for Outdoor Augmented Reality Registration. IEEE Comput. Graph. Appl. 19, 6 (Nov. 1999), 36-42. DOI=10.1109/38.799738 http://dx.doi.org/10.1109/38.799738.

Wagner, D. et al., "Real-time Panoramic Mapping and Tracking on Mobile Phones", Virtual Reality Conference (VR), 2010 IEEE Issue Date: Mar. 20-24, 2010, pp. 211-218.

X. Hu, Y. Liu, Y.Wang, Y. Hu, and D. Yan. Autocalibration of an electronic compass for augmented reality. In Proc. ISMAR 2005), pp. 182-183, Washington, DC, USA, 2005.

X. Zhang and L. Gao. A novel auto-calibration method of the vector magnetometer. In Proc. Electronic Measurement Instruments, ICEMI '09, vol. 1, pp. 145-150, Aug. 2009.

Y. Baillot, S. J. Julier, D. Brown, and M. A. Livingston. A tracker alignment framework for augmented reality. In Proc. ISMAR 2003, pp. 142-150, Tokyo, Japan, Oct. 7-10, 2003.

You, S. et.al., "Fusion of Vision and Gyro Tracking for Robust Augmented Reality Registration", Virtual Reality, 2001, Proceedings. IEEE Publication pp. 71-78, Mar. 17, 2001.

* cited by examiner

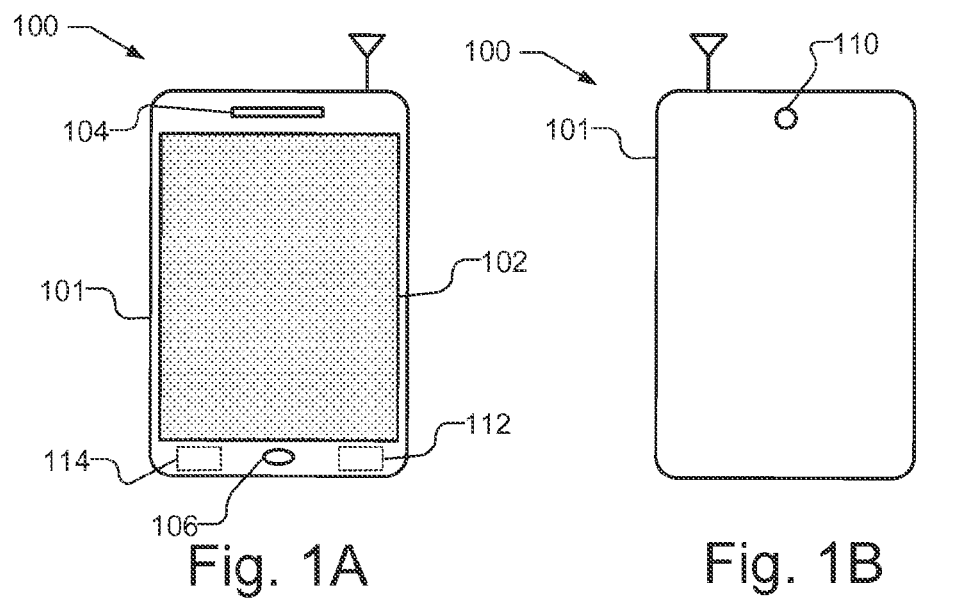
Fig. 1A
Fig. 1B
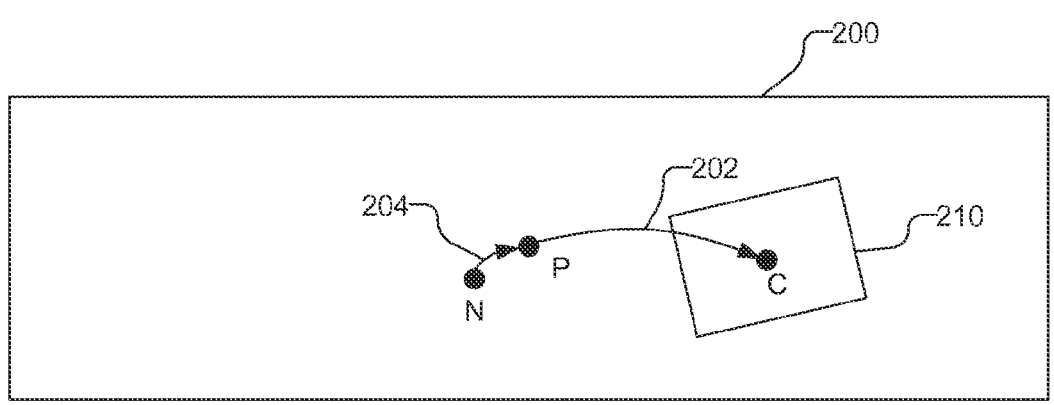
Fig. 2

NORTH CENTERED ORIENTATION TRACKING IN UNINFORMED ENVIRONMENTS

CROSS-REFERENCE TO PENDING PROVISIONAL APPLICATION

This application claims priority under 35 USC 119 to U.S. Provisional Application No. 61/349,617, filed May 28, 2010, and entitled "North Centered Orientation Tracking In Uninformed Environments" which is assigned to the assignee hereof and which is incorporated herein by reference.

BACKGROUND

With the rise of handheld augmented reality (AR) systems for mobile platforms, such as cellphones, sensors have become increasingly important. Many current AR applications on mobile platforms rely on the built-in sensors to overlay registered information over a video background. The built-in sensors used for example include satellite position system (SPS Receivers), magnetic compasses, and linear accelerometers. Unfortunately, commercial mobile platforms typically use inexpensive and low-power MEMS devices resulting in relatively poor performance compared to high quality sensors that are available.

Magnetometers, as used in magnetic compasses, and accelerometers provide absolute estimations of orientation with respect to the world reference frame. Their simple use makes them a standard component in most AR systems. However, magnetometers suffer from noise, jittering and temporal magnetic influences, often leading to substantial deviations, e.g., 10 s of degrees, in the orientation measurement. While dedicated off-the-shelf orientation sensors have improved steadily over time, commercial mobile platforms typically rely on less accurate components due to price and size limitations. Accordingly, AR applications in commercial mobile platforms suffer from the inaccurate and sometimes jittering estimation of orientation.

Vision-based tracking systems provide a more stable orientation estimation and can provide pixel accurate overlays in video-see-through systems. However, visual tracking requires a model of the environment to provide estimates with respect to a world reference frame. In mobile applications, visual tracking is often performed relative to an unknown initial orientation rather than to an absolute orientation, such as magnetic north. Consequently, vision-based tracking systems do not provide an absolute orientation in an uninformed environment, where there is no prior knowledge of the environment.

Thus, improvements are needed for mapping and tracking of a mobile platform in an uninformed environment that provides an absolute orientation with respect to the world reference frame.

SUMMARY

A mobile platform uses orientation sensors and vision-based tracking to provide tracking with absolute orientation. The mobile platform generates a panoramic map by rotating a camera, which is compared to an image frame produced by the camera, to determine the orientation of the camera with respect to the panoramic map. The mobile platform also estimates an orientation of the panoramic map with respect to a world reference frame, e.g., magnetic north, using orientation sensors, including at least one accelerometer and a magnetic sensor and, optionally, gyroscopes. The orientation of the camera with respect to the world reference frame is then determined using the orientation of the camera with respect to the panoramic map and the orientation of the panoramic map with respect to the world reference frame. A filter, such as a Kalman filter, provides an accurate and stable estimate of the orientation of the panoramic map with respect to the world reference frame, which may be updated continuously over time.

Thus, in one aspect, a method includes generating a panoramic map by rotating a camera, using orientation sensors to estimate an orientation of the panoramic map with respect to a world reference frame, comparing an image frame produced by the camera with the panoramic map to determine the orientation of the camera with respect to the panoramic map, and determining an orientation of the camera with respect to the world reference frame using the orientation of the camera with respect to the panoramic map and the orientation of the panoramic map with respect to the world reference frame. The method may further include filtering data from the orientation sensors over time to provide an increasingly accurate estimate of the orientation of the panoramic map with respect to the world reference frame.

In another aspect, an apparatus includes orientation sensors that provide orientation data, a camera, a processor connected to the orientation sensors to receive the orientation data and connected to the camera, and memory connected to the processor. The apparatus further includes software held in the memory and run in the processor causes the processor to generate a panoramic map using images from the camera as the camera is rotated, estimate an orientation of the panoramic map with respect to a world reference frame using the orientation data, compare an image frame produced by the camera with the panoramic map to determine the orientation of the camera with respect to the panoramic map, and determine an orientation of the camera with respect to the world reference frame using the orientation of the camera with respect to the panoramic map and the orientation of the panoramic map with respect to the world reference frame. Additionally, the software may cause the processor filter the orientation data from the orientation sensors over time to provide an increasingly accurate estimate of the orientation of the panoramic map with respect to the world reference frame.

In another aspect, a system includes means for generating a panoramic map by rotating a camera, means for using orientation sensors to estimate an orientation of the panoramic map with respect to a world reference frame, means for comparing an image frame produced by the camera with the panoramic map to determine the orientation of the camera with respect to the panoramic map, and means for determining an orientation of the camera with respect to the world reference frame using the orientation of the camera with respect to the panoramic map and the orientation of the panoramic map with respect to the world reference frame. The system may further include means for means for filtering data from the orientation sensors over time to provide an increasingly accurate estimate of the orientation of the panoramic map with respect to the world reference frame.

In yet another aspect, a computer-readable medium including program code stored thereon includes program code to generate a panoramic map using images from a camera as the camera is rotated, program code to estimate an orientation of the panoramic map with respect to a world reference frame using orientation data from orientation sensors, program code to compare an image frame produced by the camera with the panoramic map to determine the orientation of the camera with respect to the panoramic map, and program code to determine an orientation of the camera with respect to the world reference frame using the orientation of the camera with respect to the panoramic map and the orientation of the panoramic map with respect to the world reference frame. The computer-readable medium of claim may further include program code to filter the orientation data from the orientation sensors over time to provide an increasingly accurate estimate of the orientation of the panoramic map with respect to the world reference frame.

BRIEF DESCRIPTION OF THE DRAWING

FIGS. 1A and 1B illustrate a front side and back side, respectively, of a mobile platform capable of mapping and tracking its position in an uninformed environment with a stable absolute orientation with respect to the world reference frame.

FIG. 2 illustrates an unwrapped cylindrical map that may be produced by the vision-based tracking unit.

DETAILED DESCRIPTION

Figure 3:
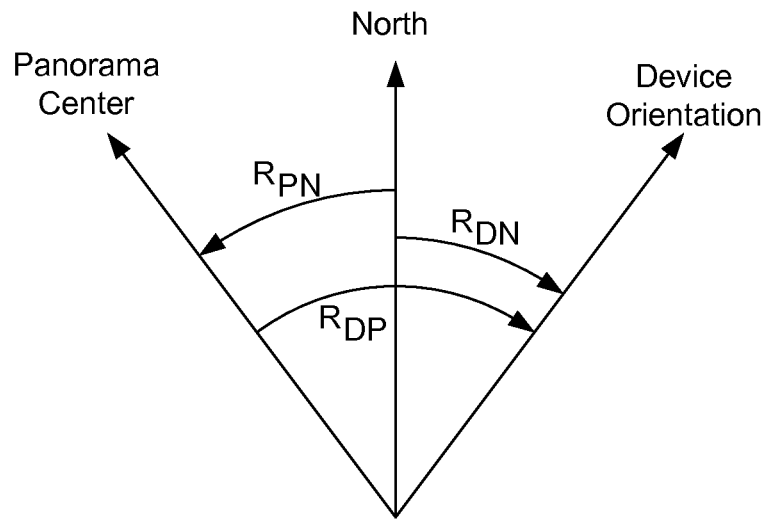
FIG. 3 illustrates an overview of the rotations between the world reference system (North), the mobile platform device reference system (Device Orientation), and the panoramic map reference system (Panorama Center).

FIGS. 1A and 1B illustrate a front side and back side, respectively, of a mobile platform 100, capable of mapping and tracking its position in an uninformed environment with a stable absolute orientation with respect to the world reference frame. Mobile platform fuses on-board sensors and vision-based orientation tracking to provide tracking with 3-degrees-of-freedom. The vision-based tracking is treated as the main modality for tracking, while the underlying panoramic map is registered to an absolute reference frame, such as magnetic north and direction of gravity, referred to herein as a world reference frame. The registration is stabilized by estimating the relative orientation between the vision-based system and the sensor-derived rotation over time in a Kalman filter-based framework.

The mobile platform 100 is illustrated as including a housing 101, a display 102, which may be a touch screen display, as well as a speaker 104 and microphone 106. The mobile platform 100 further includes a camera 110 to image the environment for a vision-based tracking unit 114. Additionally, on-board orientation sensors 112 including, e.g., three-axis magnetometers and linear accelerometers and, optionally, gyroscopes, which are included in the mobile platform 100.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of AR.

The mobile platform 100 fuses the on-board orientation sensors 112 with a vision-based tracking unit 114 to provide tracking with 3-degrees-of-freedom to provide a stable, absolute orientation. FIG. 2, for example, illustrates an unwrapped cylindrical map 200 that may be produced by the vision-based tracking unit 114. The vision-based tracking unit 114 tracks the rotation 202 between the center P of the panoramic map 200, which may be generated in real-time by the vision-based tracking unit 114, and the current orientation of the camera, illustrated by the center C of a current camera image 210 captured by camera 110. A Kalman filter is fed with data samples received from the orientation sensors 112 and the vision based tracking unit 114 in order to estimate, with increasing accuracy over time, the rotational offset 204 between the magnetic north N and the center P of the panoramic map 200. By combining the rotation 202 with the offset 204, the orientation of the current camera frame 210 can be accurately defined with respect to magnetic north, or any desired absolute orientation.

Tracking orientation using only on-board sensors results in inaccurate measurements. Inaccuracy from on-board sensors is often caused by the magnetometer being affected by magnetic anomalies, which causes the measured magnetic field vector to differ from the Earth's magnetic field resulting in errors in the (horizontal) orientation measurement. Pitch and roll are measured by measuring gravity from accelerometers and can be inaccurate due to the accelerometer not being stationary.

Accordingly, inaccuracies associated with tracking orientation using on-board sensors alone are solved using a vision-based tracking system. At the same time, the system provides an absolute orientation, e.g., from magnetic north, which cannot be achieved using only an uninformed vision-based tracking system which are capable of providing only a relative orientation from the starting point of tracking. Additionally, the present system does not require any previous knowledge of the surrounding environment.

The mobile platform 100 continuously refines the estimation of the relative orientation between the visual tracking component and the world reference frame. The world reference frame may be assumed to be magnetic north given locally by the direction to magnetic north (pointing along the positive X axis) and the gravity vector (pointing along the negative Y axis). The orientation sensors 112, which may include inertial accelerometers and/or magnetic sensors, measure the gravity and magnetic field vectors relative to the reference frame of the mobile platform. The output of the orientation sensors 112 is then a rotation $R_{DN}$ that maps the gravity vector and the north direction from the world reference frame N into the device reference frame D. As used herein, the subscripts in the notation $R_{BA}$ is read from right to left to signify a transformation from reference frame A to reference frame B.

The second tracking component is from the vision-based tracking unit 114 that estimates a panoramic map of the environment on the fly. Like the orientation sensors 112, the vision-based tracking unit 114 provides a rotation $R_{DP}$ from the reference frame P of the panoramic map into the mobile platform device reference frame D. In principle, the device reference frame D can be different for the camera 110 and the orientation sensors 112; however, assuming a calibrated mobile platform 100, the two reference frames can be assumed to be the same. For example, the fixed rotation from the inertial sensor reference frame to the camera reference frame can be calibrated upfront using, e.g., hand-eye registration methods.

Using the rotation $R_{DN}$ and the rotation $R_{DP}$, the invariant rotation $R_{PN}$ from the world reference frame N to the panorama reference frame P, can be estimated. FIG. 3 illustrates an overview of the rotations between the world reference system (North), the mobile platform device reference system (Device Orientation), and the panoramic map reference system (Panorama Center). Composing the rotations from world to panorama to device reference frame, the following is obtained:

$$R_{DN} = R_{DP} \cdot R_{PN} \Leftrightarrow \qquad \text{eq. 1}$$

$$R_{PN} = R_{DP}^{-1} \cdot R_{DN} \qquad \text{eq. 2}$$

Using equation (2), the relative rotation $R_{PN}$ from the world reference frame N to the panorama reference frame P can be estimated in real-time.

The estimation of the orientation of the mobile platform 100 from measurements from sensors 112, including inertial sensors and magnetometers as follows. At a timestamp t, the measurements $g_t$ for the gravity vector g and $m_t$ for the magnetic field vector are received, where g is defined in the world reference frame. A rotation $R_{DN} = [r_x, r_y, r_z]$ may be calculated as follows:

$$g_t = R_{DN} \cdot g, \qquad \text{eq. 3}$$

$$m_t \cdot r_z = 0. \qquad \text{eq. 4}$$

The resulting rotation $R_{DN}$ accurately represents the pitch and roll measured through the linear accelerometers. It should be understood that this is valid only if the mobile platform 100 is stationary (or experiencing zero acceleration). Otherwise, acceleration cannot be separated from gravity using the accelerometers alone and the pitch and roll estimates may be inaccurate. The magnetic field vector, however, may vary within the plane of up and north direction (X-Y plane). This reflects the observation that the magnetic field vector is noisier and introduces errors into roll and pitch. The columns of $R_{DN}$ may be computed as $$r_y = \frac{g_t}{\|g_t\|}, r_z = \frac{m_t}{\|m_t\|} \times r_y, r_x = r_y \times r_z. \qquad \text{eq. 5}$$

For the camera image frame that is available at the timestamp t, the vision-based tracking unit 114 provides a measurement of the rotation $R_{DP}$.

The vision-based tracking unit 114 provides mapping and tracking of the environment in real time. The vision-based tracking unit 114 generates a panoramic map of the environment as a two-dimensional cylindrical map, which assumes pure rotational movement of the mobile platform. The cylindrical panoramic map of the environment is generated on the fly and the map is simultaneously used to track the orientation of the mobile platform. The vision-based tracking unit 114 is capable of, e.g., approximately 15 ms per frame, and permits interactive applications running at high frame rates (30 Hz).

The vision-based tracking unit 114 assumes that the camera 110 undergoes only rotational motion. Under this constraint, there are no parallax effects and the environment can be mapped onto a closed 2D surface. Although a perfect rotation-only motion is unlikely for a handheld camera, the method can tolerate enough error for casual operation, particularly outdoors, where distances are usually large compared to the translational movements of the mobile phone.

Figure 4:
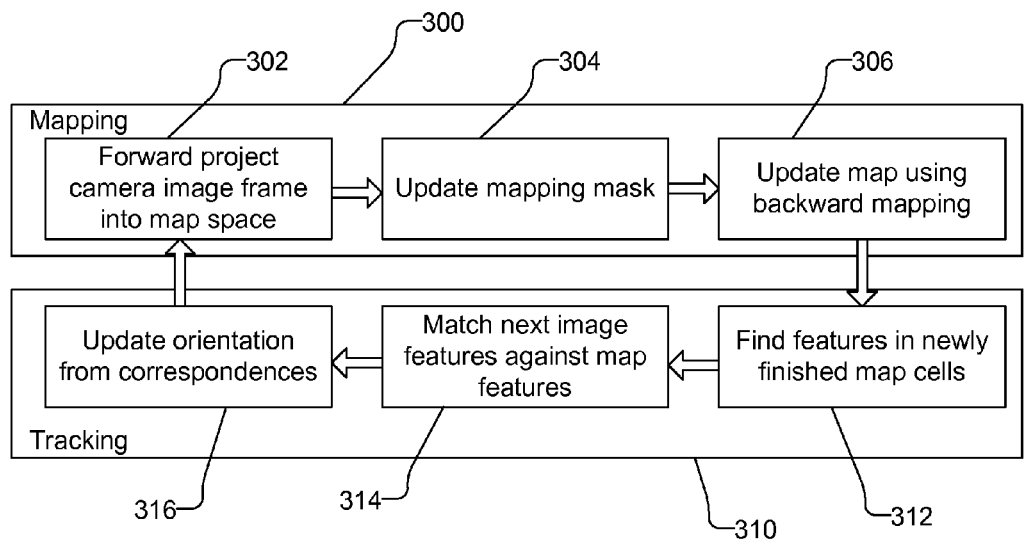
FIG. 4 is a flow chart illustrating the process of real-time panoramic mapping and tracking by the vision-based tracking unit in mobile platform.

FIG. 4 illustrates a flow chart of the panorama mapping process 300 and the tracking process 310 utilized by mobile platform 100. Tracking requires a map for estimating the orientation, whereas mapping requires an orientation for updating the map. A known starting orientation with a sufficient number of natural features in view may be used to initialize the map. As illustrated, the current camera image frame is forward projected into the panoramic map space (302). A mapping mask is updated (304) and the map is updated using backward mapping (306). Features are found in the newly finished cells of the map (312). The map features are matched against features extracted from the next camera image (314) and based on correspondences, the orientation of the mobile platform is updated (316). Thus, when the mapping process starts, the first camera frame is completely projected into the map and serves as a starting point for tracking. A panoramic cylindrical map is extended by projecting areas of any image frame that correspond to unmapped portions of the panoramic cylindrical map. Thus, each pixel in the panoramic cylindrical map is filled only once.

Figure 5:
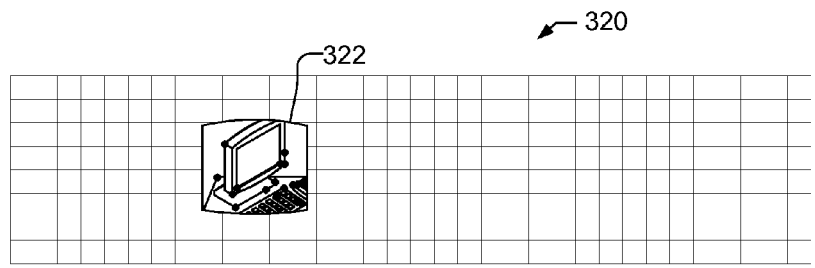
FIG. 5 illustrates an unwrapped cylindrical map that is split into a regular grid of cells and illustrates a first frame projected and filled on the map.

A cylindrical map is used for panoramic mapping as a cylindrical map can be trivially unwrapped to a single texture with a single discontinuity on the left and right borders. FIG. 5, by way of example, illustrates an unwrapped cylindrical map 320 that is split into a regular grid, e.g., of 32×8 cells, and illustrates a first frame 322 projected and filled on the map 320. Every cell in the map 320 has one of two states: either unfinished (empty or partially filled with mapped pixels) or finished (completely filled). When a cell is finished, it may be down-sampled from full resolution to a lower level and keypoints are extracted for tracking purposes. The crosses in the first frame 322 mark keypoints that are extracted from the image.

Figure 6:
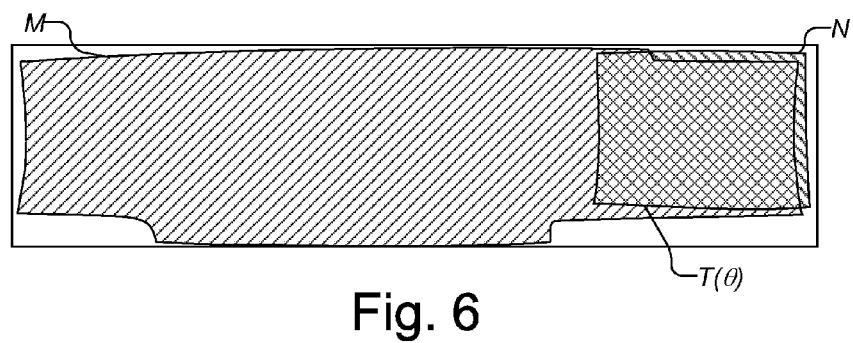
FIG. 6 illustrates a map mask that may be created, e.g., during rotation of the mobile platform.

Pixel-accurate book keeping for the mapping is done using a run length encoded coverage mask. The mapping mask is used to filter out pixels that fall inside the projected camera frame but that have already been mapped. A run-length encoded (RLE) mask may be used to store zero or more spans per row that define which pixels of the row are mapped and which are not. A span is a compact representation that only stores its left and right coordinates. Spans are highly efficient for Boolean operations, which can be quickly executed by simply comparing the left and right coordinates of two spans. FIG. 6, by way of example, illustrates a map mask M that may be created, e.g., during rotation of the mobile platform 100 to the right. The map mask M may be defined for a cylindrical map at its highest resolution. Initially the map mask M is empty. For every frame, the projected camera frame is rasterized into spans creating a temporary mask $T(\theta)$ that describes which pixels can be mapped with the current orientation $\theta$ of the mobile platform 100. The temporary camera mask $T(\theta)$ and the map mask M are combined using a row-wise Boolean operation. The resulting mask N contains locations for only those pixel that are set in the camera mask $T(\theta)$ but are not in the map mask M. Hence, mask N describes those pixels in the map that will be filled by the current image frame. The map mask M is updated to include the new pixels. The use of a map mask, result in every pixel of the map being written only once, and only few (usually <1000) pixels are mapped per frame (after the initial frame is mapped).

The panoramic mapping requires initialization with a reasonable starting orientation for the mobile platform 100, e.g., the roll and pitch of the mobile platform 100 are minimized. For mobile phones with a linear accelerometer, the roll and pitch angles can be automatically determined and accounted for. If the mobile platform 100 contains no additional sensors, the user may start the mapping process while holding the mobile platform with roughly zero pitch and roll.

The mapping process 300 assumes an accurate estimate of the orientation of the mobile platform 100. Once the panoramic map is filled in step 306, the orientation of the mobile platform 100 can be determined using the tracking process 310. As illustrated in FIG. 4, once the panoramic map is filled in step 306, features are found in the newly finished cells in step 312. Keypoints may be extracted from finished cells using the FAST (Features from Accelerated Segment Test) corner detector. Of course, other methods for extracting keypoints may be used, such as Scale Invariant Feature Transform (SIFT), or Speeded-up Robust Features (SURF), or any other desired method. For every keypoint, FAST provides a score of how strong the corner appears.

The keypoints are organized on a cell-level because it is more efficient to extract keypoints in a single run once an area of a certain size is finished. Moreover, extracting keypoints from finished cells avoids problems associated with looking for keypoints close to areas that have not yet been finished, i.e., because each cell is treated as a separate image, the corner detector itself takes care to respect the cell's border. Finally, organizing keypoints by cells provides an efficient method to determine which keypoints to match during tracking.

With the features in the map extracted (step 312 in FIG. 4), the map features are matched against features extracted from the next camera image (step 314). An active-search procedure based on a motion model may be applied to track keypoints from one camera image to the following camera image. Keypoints in the next camera image are extracted and compared against keypoints in the map that were extracted in step 312. Accordingly, unlike other tracking methods, this tracking approach is generally drift-free. However, errors in the mapping process may accumulate so that the map is not 100% accurate. For example, a map that is created with a mobile platform 100 held at an angle is not mapped exactly with the angle in the database. However, once the map is built, tracking is as accurate as the map that has been created.

The motion model provides a rough estimate for the camera orientation in the next camera frame, which is then refined. Based on the estimated orientation, keypoints from the map are projected into the camera image. For all projected keypoints that fall inside the camera view, an 8×8 pixel wide patches is produced by affinely warping the map area around the keypoint using the current orientation matrix. The warped patches represent the support areas for the keypoints as they should appear in the current camera image. The tracker uses Normalized Cross Correlation (NCC) (over a search area) at the expected keypoint locations in the camera image. A coarse-to-fine approach is used to track keypoints over long distances despite a small search area. First, keypoints are matched at quarter resolution, then half resolution and finally full resolution. The matching scores of the NCC are used to fit a 2D quadratic term for sub-pixel accuracy. Since all three degrees of freedom of the camera are respected while warping the patches, the template matching works for arbitrary camera orientations. The correspondences between 3D cylinder coordinates and 2D camera coordinates are used in a non-linear refinement process with the rough orientation estimate as a starting point. Reprojection errors and outliers are dealt with using an M-estimator.

The mapping process may accumulate errors resulting in a map that is not 100% accurate. Accordingly, as a remedy, loop closing techniques may be used to minimize errors that accumulate over a full 360° horizontal rotation. Thus, the map may be extended to cover a horizontal angle larger than 360°, e.g., by an additional angle of 45° (4 columns of cells), which is sufficient for robust loop detection. The loop closing is performed, e.g., when only one column of cells is unfinished in the map. Keypoints are extracted from overlapping regions in the map and a matching process, such as RANSAC (RANdom SAmple Consensus) is performed. A transformation is used to align the matched keypoints in the overlapping regions to minimize the offset between keypoint pairs. For vertical alignment a shear transformation may be applied using as a pivot the cell column farthest away from the gap. Both operations use Lanczos filtered sampling to minimize resampling artifacts.

As long as tracking succeeds, camera frames may be stored at quarter resolution together with their estimated pose. When tracking fails, the current camera image is compared against all stored keyframes and the pose from the best match is used as the coarse guess to re-initialize the tracking process.

Additional information regarding panoramic mapping and tracking is provided in U.S. Ser. No. 13/112,876, entitled "Visual Tracking Using Panoramas On Mobile Devices" and filed on May 20, 2011 by D. Wagner, which is assigned to the assignee hereof and which is incorporated herein by reference. If desired, other methods of generating panoramic maps may be used.

Given the measurement from the sensors 112, i.e., $R_{DN}$, and the measurement from the vision-based tracking unit 114, i.e., $R_{DP}$, the rotation $R_{PN}$ can be determined through equation 2.

In order to provide tracking with a stable orientation, which is not affected by inaccuracies associated with on-board sensors, a Kalman filter is used. An extended Kalman filter (EKF) is used to estimate the three parameters of the rotation $R_{PN}$ using the exponential map of the Lie group SO(3) of rigid body rotations. The filter state at time t is an element of the associated Lie algebra so(3), represented as a 3-vector $\mu_t$. This element describes the error in the estimation of the rotation $R_{PN}$ and $\mu$ is normal distributed with mean 0 and a covariance $P_t$, $\mu_t \sim N(O, P_t)$. It relates the current estimate $\hat{R}_t$ to the real $R_{PN}$ through the following relation $$R_{PN} = \exp(\mu) \cdot \hat{R}_t \qquad \text{eq. 6}$$

Here exp( ) maps from an element in the Lie algebra so(3) to an element of the Lie group SO(3), i.e., a rotation R. Conversely, log(R) maps a rotation in SO(3) into the Lie algebra so(3).

The covariance $P_t$ describes the filters uncertainty about the state at time t. As a constant is being estimated, a constant position motion model is assumed, where $\mu$ does not change and the covariance grows through noise represented by a fixed noise covariance matrix parameterized by a small process noise $\sigma_p$ to account for long-term changes in the environment, where σp can be chosen experimentally by minimizing the estimation error in a setup where the orientation estimates are compared to ground-truth orientation measurements. The prediction equations are then:

$$\mu_{t+\delta t} = \mu_t; \text{ and} \qquad \text{eq. 7}$$

$$\tilde{P}_{t+\delta t} = P_t + \sigma_p^2 \delta t I_3 \qquad \text{eq. 8}$$

If desired, rather than using a fixed value for $\sigma_p$, the value may be decreased if the confidence in the orientation measurement is high and vice versa, reduced if the confidence is low. For instance, if the mobile platform 100 is exposed to magnetic anomalies, the measured magnetometer vector will not have the length corresponding to the Earth's magnetic field, indicating a less reliable orientation estimate, and thus, the value of $\sigma_p$ may be increased.

The subscript t is dropped in the following for clarity. To update the filter with a new measurement $R_{PN}$, computed with equation 2, a small innovation motion $R_i$ is computed from the prior filter state rotation $\Leftrightarrow$ to the measurement rotation $R_{PN}$ as $$R_i = R_{PN} \cdot \Leftrightarrow^{-1}. \qquad \text{eq. 9}$$

Figure 7:
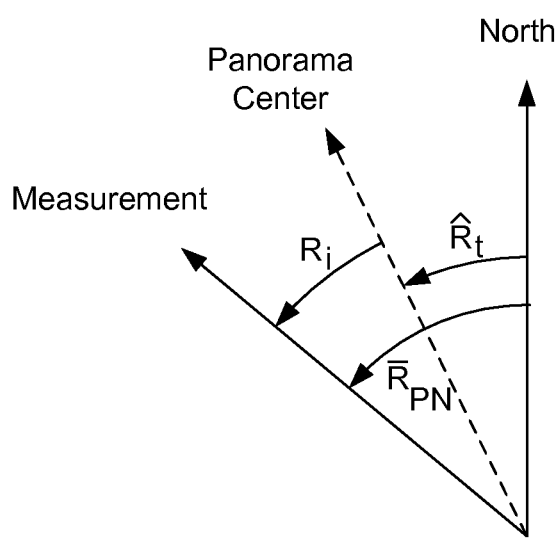
FIG. 7 illustrates an innovation rotation $R_i$ given a Kalman filter's status $\hat{R}_t$ and a new measurement $R_{PN}$.

FIG. 7 illustrates the innovation rotation $R_i$ given the Kalman filter's status $\bar{R}_t$ and a new measurement $R_{PN}$.

The measurement equation for the state μ is the SO3 logarithm of $R_i$ $$\mu = \log(R_i) \qquad \text{eq. 10}$$

Thus, the derivative of the measurement equation 10 with respect to the state μ is the identity $I_3$ and the Kalman gain K is determined as $$K = \hat{P} \cdot (\hat{P} + M)^{-1}, \qquad \text{eq. 11}$$

where M is the 3×3 measurement covariance matrix of $R_{PN}$ transformed into the space of $R_i$. The posterior state estimate is then given by weighing the innovation motion with the Kalman filter gain K and multiplying it onto the prior estimate $$\Leftrightarrow = \exp(K \cdot \log(R_i)) \cdot \Leftrightarrow. \qquad \text{eq. 12}$$

The posterior state covariance matrix P is updated using the normal Kalman filter equations.

The global orientation of the device within the world reference frame is determined through concatenation of the estimated panorama reference frame orientation $R_{PN}$ and the measured orientation from the vision-based tracking unit 114 $R_{DP}$ as described in equation 1. Thus, an accurate, but relative orientation from vision-based tracking unit 114 is combined with a filtered estimate of the reference frame orientation.

It should be noted that the vision-based tracking unit 114 may add some bias as the relative orientation estimation can over- or under-estimate the true angle of rotation, if the focal length of the camera is not known accurately. Thus, a correction factor may be added to the filter estimate to estimate this bias and correct for this bias in the final rotation output. Additionally, the Kalman filter depends on receiving measurements under different orientations for errors to average out. Measuring errors over time in a certain orientation will pull the estimate towards that orientation and away from the true average. Thus, a purely temporal filtering of errors may not be ideal. Accordingly, it may be desirable to filter over the different orientations of the mobile platform 100 while also down-weighing old measurements to account for changes over time.

Figure 8:
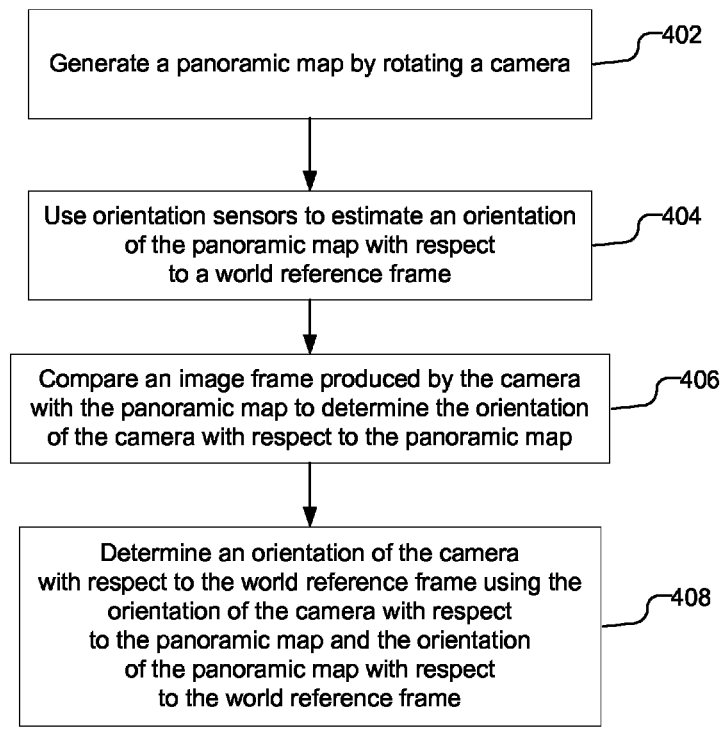
FIG. 8 illustrates a flow chart of the process of fusing the orientation sensors with a vision-based tracking unit to provide tracking with 3-degrees-of-freedom with absolute orientation.

FIG. 8 illustrates a flow chart of the process of fusing the on-board orientation sensors 112 with a vision-based tracking unit 114 to provide tracking with 3-degrees-of-freedom with absolute orientation. As illustrated, a panoramic map of the uninformed environment is generated by rotating the camera (402). Orientation sensors on board the mobile platform are used to estimate an orientation of the panoramic map with respect to a world reference frame (404), i.e., $R_{PN}$. The world reference frame may be any absolute reference frame, such as magnetic north. The data from the orientation sensors may be filtered over time, e.g., by the Kalman filter, to provide an increasingly accurate and stable estimate of the orientation of the panoramic map with respect to world reference frame. The estimate of the orientation of the panoramic map may be continuously updated over time. The orientation sensors include an accelerometer, and a magnetic sensor and, optionally, one or more gyroscopes. A current image frame captured by the camera is compared to the panoramic map to determine the orientation of the camera with respect to the panoramic map (406), i.e., rotation $R_{DP}$. The orientation of the camera with respect to the world reference frame, i.e., rotation $R_{DN}$, is determined using the orientation of the camera with respect to the panoramic map, i.e., rotation $R_{DP}$, and the orientation of the panoramic map with respect to the world reference frame (408), i.e., rotation $R_{PN}$. The orientation of the camera with respect to the world reference frame may be determined in real time.

Figure 9:
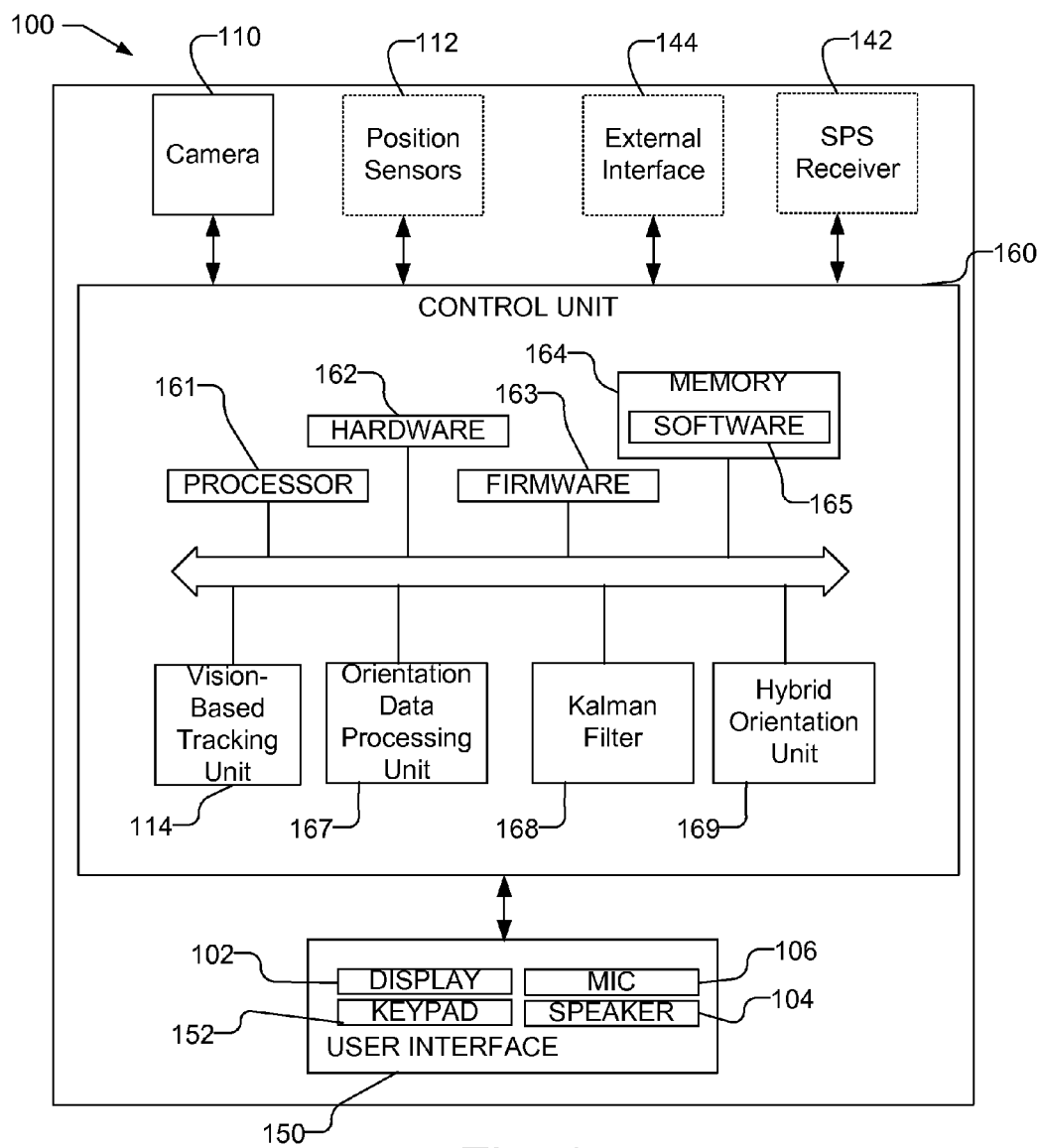
FIG. 9 is a block diagram of a mobile platform capable of mapping and tracking its position in an uninformed environment with absolute and stable orientation with respect to the world reference frame.

FIG. 9 is a block diagram of a mobile platform 100 capable of mapping and tracking its position in an uninformed environment with absolute and stable orientation with respect to the world reference frame. The mobile platform 100 includes the camera 110 as well as orientation sensors 112, which may be magnetometers, linear accelerometers, gyroscopes, or other similar positioning devices. For example, the orientation sensors 112 may be AKM AK8973 3-axis electronic compass, and a Bosch BMA150 3-axis acceleration sensor.

The mobile platform 100 also includes a user interface 150 that includes the display 102 capable of displaying images captured by the camera 110. The user interface 150 may also include a keypad 152 or other input device through which the user can input information into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone. The microphone 106 may be used to input audio annotations. Of course, mobile platform 100 may include other elements unrelated to the present disclosure, such as a satellite positioning system (SPS) receiver 142 capable of receiving positioning signals from an SPS system, and an external interface 144, such as a wireless transceiver. Additionally, while the mobile platform 100 is illustrated as including a display 102 to display images captured by the camera 110, if desired, the mobile platform 100 may track orientation using the visual sensor, i.e., camera 110 combined with the non-visual sensors, i.e., orientation sensors 112, as described herein without the use of the display 102, i.e., no images are displayed to the user, and thus, mobile platform 100 need not include the display 102.

The mobile platform 100 also includes a control unit 160 that is connected to and communicates with the camera 110 and orientation sensors 112, and user interface 150, as well as other systems that may be present, such as the SPS receiver 142 and external interface 144. The control unit 160 accepts and processes data from the camera 110 and orientation sensors 112 as discussed above. The control unit 160 may be provided by a processor 161 and associated memory 164, hardware 162, software 165, and firmware 163. The mobile platform 100 includes the vision-based tracking unit 114, the operation of which is discussed above. The mobile platform 100 further includes an orientation data processing unit 167 for processing the data provided by the orientation sensors 112, as discussed above. For example, the orientation data processing unit 167 may be an application-programming-interface (API) that automatically performs online calibration of the orientation sensors 112 in the background. With the use of magnetic sensors, which provide raw 3D vectors of gravity and magnetic north, the data can be used to calculate directly the 3×3 rotation matrix representing the orientation of the mobile platform 100. Additionally to provide a stable and increasingly accurate orientation, mobile platform 100 includes a Kalman filter 168, the operation of which is discussed above. Using the measurements provided by the vision-based tracking unit, orientation data processing unit 167 and Kalman filter 168, a hybrid orientation unit 169 may determine the orientation of the camera 110, and, thus, the mobile platform 100, with respect to the world reference frame as discussed above. The hybrid orientation unit 169 can run both in floating- and in fixed-point, the latter for higher efficiency on cellular phones.

The vision-based tracking unit, orientation data processing unit 167, Kalman filter 168 and hybrid orientation unit 169 are illustrated separately and separate from processor 161 for clarity, but may be a single unit and/or implemented in the processor 161 based on instructions in the software 165 which is run in the processor 161. It will be understood as used herein that the processor 161, as well as one or more of the vision-based tracking unit, orientation data processing unit 167, Kalman filter 168 and hybrid orientation unit 169 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
generating a panoramic map, at a mobile device, based on images captured from a camera;
using orientation sensors, at a mobile device, to estimate an orientation of the panoramic map with respect to a world reference frame;
determining the orientation of the camera with respect to the panoramic map based on matching at least one feature from an image frame produced by the camera to at least one feature from the panoramic map; and
determining an orientation of the camera with respect to the world reference frame based on the orientation of the camera with respect to the panoramic map and the orientation of the panoramic map with respect to the world reference frame.

2. The method of claim 1, further comprises:
filtering data based on the orientation sensors and the orientation of the camera with respect to the panoramic map over time; and
adjusting the orientation of the panoramic map with respect to the world reference frame based on the filtered data.

3. The method of claim 2, wherein the estimate of the orientation of the panoramic map is continuously updated over time.

4. The method of claim 1, wherein the world reference frame is magnetic north.

5. The method of claim 1, wherein determining the orientation of the camera with respect to the world reference frame using the orientation of the camera with respect to the panoramic map and the orientation of the panoramic map with respect to the world reference frame is performed in real time.

6. The method of claim 1, wherein the orientation sensors comprise at least one accelerometer and magnetic sensor.

7. The method of claim 1, wherein the panoramic map consists of a plurality of cells, and further comprising:
extracting at least one cell feature from each of the plurality of cells; and
wherein the matching the at least one feature image frame produced by the camera to the at least one feature from the panoramic map comprises:
extracting at least one image feature from the image frame; and
comparing the at least one cell feature to the at least one image feature.

8. The method of claim 1, further comprising:
adjusting the orientation of the panoramic map with respect to the world reference frame based on the orientation of the camera with respect to the panoramic map and the orientation sensors.

9. A mobile device comprising:
orientation sensors configured to provide orientation data;
a camera;
a processor connected to the orientation sensors, wherein the processor configured to receive the orientation data and further configured to access image data acquired by the camera; and
memory in communication with the processor, wherein the memory is configured to store instructions configured to cause the processor to generate a panoramic map using images from the camera, estimate an orientation of the panoramic map with respect to a world reference frame using the orientation data, determine the orientation of the camera with respect to the panoramic map based on matching at least one feature from an image frame produced by the camera to at least one feature from the panoramic map, determine an orientation of the camera with respect to the world reference frame based on the orientation of the camera with respect to the panoramic map and the orientation of the panoramic map with respect to the world reference frame.

10. The apparatus of claim 9, wherein the instructions further configured to cause the processor to filter data based on the orientation sensors and the orientation of the camera with respect to the panoramic map over time, and to adjust the orientation of the panoramic map with respect to the world reference frame based on the filtered data.

11. The apparatus of claim 10, wherein the instructions are configured to update the estimate of the orientation of the panoramic map continuously over time.

12. The apparatus of claim 9, wherein the world reference frame is an absolute reference frame.

13. The apparatus of claim 9, wherein the instructions configured to determine in real time the orientation of the camera with respect to the world reference frame using the orientation of the camera with respect to the panoramic map and the orientation of the panoramic map with respect to the world reference frame.

14. The apparatus of claim 9, wherein the orientation sensors comprise at least one accelerometer and at least one magnetic sensor.

15. A system comprising:
means for generating a panoramic map, at a mobile device, based on images captures from a camera;
means for using orientation sensors, at a mobile device, to estimate an orientation of the panoramic map with respect to a world reference frame;
means for determining the orientation of the camera with respect to the panoramic map based on matching at least one feature from an image frame produced by the camera to at least one feature from the panoramic map; and
means for determining an orientation of the camera with respect to the world reference frame based on the orientation of the camera with respect to the panoramic map and the orientation of the panoramic map with respect to the world reference frame.

16. The system of claim 15, further comprising:
means for filtering data based on the orientation sensors and the orientation of the camera with respect to the panoramic map over time; and
means for adjusting the orientation of the panoramic map with respect to the world reference frame based on the filtered data.

17. The system of claim 16, wherein the estimate of the orientation of the panoramic map is continuously updated over time.

18. The system of claim 15, wherein the world reference frame is magnetic north.

19. The system of claim 15, wherein the means for determining the orientation of the camera with respect to the world reference frame using the orientation of the camera with respect to the panoramic map and the orientation of the panoramic map with respect to the world reference frame determines the orientation of the camera with respect to the world reference frame in real time.

20. The system of claim 15, wherein the orientation sensors comprise at least one accelerometer, and at least one magnetic sensor, or any combination thereof.

21. A non-transitory computer-readable medium including program code stored thereon, comprising:
program code to generate a panoramic map, at a mobile device, using images from a camera;
program code to estimate an orientation of the panoramic map with respect to a world reference frame using orientation data from orientation sensors at a mobile device;
program code to determine the orientation of the camera with respect to the panoramic map based on matching at least one feature from an image frame produced by the camera to at least one feature from the panoramic map;
program code to determine an orientation of the camera with respect to the world reference frame using the orientation of the camera with respect to the panoramic map and the orientation of the panoramic map with respect to the world reference frame.

22. The computer-readable medium of claim 21, further comprising:
program code to filter data based on the orientation sensors and the orientation of the panoramic map with respect to the world reference frame over time; and
program code to adjust the orientation of the panoramic map with respect to the world reference frame based on the filtered data.

23. The computer-readable medium of claim 22, wherein the estimate of the orientation of the panoramic map is continuously updated over time.

24. The computer-readable medium of claim 21, wherein the world reference frame is magnetic north.

25. The computer-readable medium of claim 21, wherein the program code to determine the orientation of the camera with respect to the world reference frame using the orientation of the camera with respect to the panoramic map and the orientation of the panoramic map with respect to the world reference frame determines the orientation of the camera with respect to the world reference frame in real time.

26. The computer-readable medium of claim 21, wherein the orientation sensors comprise at least one accelerometers and magnetic sensor.

* * * * *